United States Patent [19]
Tien et al.

[11] Patent Number: 6,066,692
[45] Date of Patent: May 23, 2000

[54] TWO COMPONENT WATERBORNE URETHANE/VINYL POLYMER COMPOSITE FOR COATING APPLICATIONS

[75] Inventors: Chao-fong Tien, Macungie; Ning Chen, Jamison; Frank Vito DiStefano; Thomas Michael Santosusso, both of Macungie, all of Pa.

[73] Assignee: Air Products and Chemicals, Inc., Allentown, Pa.

[21] Appl. No.: 09/183,922

[22] Filed: Oct. 30, 1998

[51] Int. Cl.$^7$ .................. C08J 3/00; C08K 3/20; C08L 75/00; C08F 8/30; C08F 283/04
[52] U.S. Cl. .................. 524/507; 524/591; 525/123; 525/455
[58] Field of Search .................. 524/507, 591; 525/123, 455

[56] References Cited

U.S. PATENT DOCUMENTS

| | | | |
|---|---|---|---|
| 5,075,370 | 12/1991 | Kubitza et al. | 524/591 |
| 5,194,487 | 3/1993 | Jacobs | 524/591 |
| 5,200,489 | 4/1993 | Jacobs et al. | 528/49 |
| 5,331,039 | 7/1994 | Blum et al. | 524/507 |
| 5,508,340 | 4/1996 | Hart | 524/591 |
| 5,523,344 | 6/1996 | Maksymkiw et al. | 524/507 |
| 5,552,477 | 9/1996 | Dhein et al. | 524/840 |
| 5,563,207 | 10/1996 | Brahm et al. | 524/591 |

OTHER PUBLICATIONS

J. Feng, et al., "Effect of Hard Polymer Filler Particles on Polymer Diffusion in Low–Tg Latex Film," *Macromolecules*, vol. 31, 1998, pp. 5290–5299.

S. T. Eckersley, et al., "Mechanistic Considerations of Particle Size Effects on Film Properties of Hard/Soft Latex Blends," *Journal of Coatings Technology*, vol. 69, No. 864, Jan. 1997, pp. 97–107.

*Primary Examiner*—Patrick D. Niland
*Attorney, Agent, or Firm*—Mary E. Bongiorno

[57] ABSTRACT

A heterogeneous two component waterborne urethane/vinyl polymer composition, the method of making the composition, and the coating derived therefrom. The composition is a low or zero VOC composition containing a polyol stabilized non-functional, high Tg, aqueous vinyl polymer latex, a water dispersible polyisocyanate, and, optionally, a polyhydric alcohol. The composition is formed by emulsion polymerizing one or more vinyl monomers which will form a high Tg polymer, in the presence of an emulsifier containing one or more acid-containing polyols which have been neutralized with one or more reactive amines, and combining the resulting polyol-stabilized high Tg aqueous vinyl polymer latex with a water-dispersible polyisocyanate and, optionally, a polyhydric alcohol.

25 Claims, No Drawings

TWO COMPONENT WATERBORNE URETHANE/VINYL POLYMER COMPOSITE FOR COATING APPLICATIONS

BACKGROUND OF THE INVENTION

In recent times, reducing the volatile organic content (VOC) of coating formulations has been a major research focus in the paint and coatings industries. This is mainly driven by government regulations to reduce volatile organics released into the atmosphere. To meet this challenge, higher solid, waterborne and powder coatings have received increased attention as potential substitutes for solvent based coatings system. However, most of these coating systems are less resistant to chemical and solvent attack, they are lower in gloss and, in many cases, they are substantially more expensive than solvent based systems.

Polyurethanes have been particularly important in coatings by virtue of their outstanding properties. Waterborne polyurethanes and their use for coatings have been known for many years. They possess many properties that are significantly superior to other waterborne systems, but they are still insufficient to match the performance of solvent based two-component polyurethane systems. This is especially true regarding hardness, gloss, and solvent resistance. The development of two-component waterborne polyurethanes has helped overcome some of these deficiencies. However, most of the two-component waterborne systems are not completely free of VOC and are expensive.

Representative examples from the patent literature which describe advancements in two-component water dispersible polyurethanes follows.

U.S. Pat. No. 5,075,370 (Kubitza et al., 1991) discloses a two-component, aqueous coating composition which contains as binder components a polymer polyol component having carboxylic or sulfonic acid groups, such as a hydroxyacrylate polymer, and a polyisocyanate component in quantities corresponding to an NCO/OH equivalent ratio of about 0.5:1 to 5:1. The polyisocyanate component is emulsified in an aqueous solution of the polymer polyol component.

U.S. Pat. No. 5,194,487 (Jacobs, 1993) discloses two-component, aqueous polyurethane dispersions for coatings which contain an isocyanate-reactive component in which there is an aqueous dispersion of a hydroxy functional polyurethane and a polyol, and a water dispersible polyisocyanate component. The two components are present in an amount to provide an equivalent ratio of isocyanate to hydroxyl groups of 0.8:1 to 4:1. Organic solvents can be used in the production of the hydroxy functional polyurethanes and in reducing the viscosity of the water dispersible polyisocyanate component.

U.S. Pat. No. 5,331,039 (Blum et al., 1994) discloses two-component coating compositions in which the aqueous binder composition is based on at least two water dispersible polyol polymers and a polyisocyanate component dispersed therein and the NCO:OH equivalent ratio is 0.2:1 to 5:1. Five general groups of water dispersible polyol polymers are described; for example, polyester resin containing urethane, carboxyl and/or hydroxy groups, polyacrylate resins containing hydroxyl, carboxylate and/or sulfonate groups, and an acrylate-grafted polyester resins containing hydroxyl, carboxylate and/or sulfonate groups.

U.S. Pat. No. 5,552,477 (Dhein et al., 1996) discloses a method for producing an aqueous coating agent based on a polyol component dissolved and/or dispersed in water which is combined with a reactive diluent having at least one group which is reactive with isocyanate groups, and a polyisocyanate component emulsified in the aqueous solution or dispersion of the polyol. The polyol component consists of at least one water-dilutable polyacrylic resin or polyester resin containing hydroxyl groups and chemically bonded carboxylate and/or sulphonate groups, and the polyisocyanate component is not hydrophilicly modified. The equivalent ratio of isocyanate groups to groups capable of reacting with isocyanate groups is 0.5:1 to 5:1.

U.S. Pat. No. 5,508,340 (Hart, 1996) discloses a substantially solvent free aqueous two-component polyurethane coating composition in which one component is a combined polyol and amine phase and the other component is a polyisocyanate. The ratio between the isocyanate equivalents and the sum of the active hydrogen equivalents of the polyols and amines is at least 0.5:1.

The following publications provide background on the way high Tg polymer particles affect latex films:

J. Feng, et al., "Effect of Hard Polymer Filler Particles on Polymer Diffusion in Low-Tg Latex Film," *Macromolecules*, Vol.31, 1998, pages 5290–5299.

S. T. Eckersley, et al., "Mechanistic Considerations of Particle Size Effects on Film Properties of Hard/Soft Latex Blends," *Journal of Coatings Technology*, Vol. 69, No. 864, January 1997, pages 97–107.

BRIEF SUMMARY OF THE INVENTION

The present invention is directed to an improved aqueous based, two component coating composition and to the coating formed therefrom. The coating composition is a combination of a water dispersible polyisocyanate, optionally, a polyhydric alcohol, and a non-functional, high Tg, aqueous vinyl polymer latex stabilized with a polyol emulsifier. One or more substantially non-functional (i.e., containing substantially no hydroxyl or carboxyl groups) vinyl monomers are emulsion polymerized in an aqueous medium containing one or more water dispersible and/or water soluble low molecular weight (Mn of about 500 to 5000), acid-containing polyols as emulsifier and one or more aqueous reactive amines as counter ions to the polyol. By reactive amines is meant amines which contain functional groups which will react with isocyanate groups. The vinyl monomers should be such as to form a high Tg polymer. By high Tg is meant a Tg above the ambient temperature at which the coating is applied or temperature to which the coating will be exposed. The high Tg vinyl polymer latex is combined with a water dispersible polyisocyanate in an amount such that the equivalent ratio of isocyanate to hydroxyl groups ranges from 0.5:1 to 5:1. Preferably, a polyhydric alcohol is also mixed with the high Tg vinyl polymer latex and the water dispersible polyisocyanate. A preferred two component coating composition can be prepared by the following procedure:

a) neutralizing one or more acid-containing, water dispersible polyols with one or more reactive amines;

b) mixing the neutralized acid-containing, water dispersible polyol with one or more non-functional vinyl monomers, preferably containing at least one multi-vinyl monomer, such that the combination of monomers will form a high Tg polymer;

c) mixing a free radical initiator with the polyol/monomer mixture in an aqueous medium;

d) polymerizing the vinyl monomers by heating the aqueous dispersion;

e) cooling the aqueous polymer emulsion; and f) mixing the aqueous polymer emulsion with a water dispersible polyisocyanate and a polyhydric alcohol.

This composition offers many advantages in coating applications; for example:

- an ability to produce a coating composition with a short drying time; i.e., 15 minutes to 1 hour;
- an ability to use less water dispersible polyisocyanate than conventional two-component urethane systems;
- an ability to formulate a very low or zero VOC coating composition;
- an ability to produce a coating composition having a pot life of at least about 4 hours;
- an ability to apply the coating composition to metal, plastic, wood, or paper substrate by conventional procedures;
- an ability to form a coating which gives protection from solvent corrosion and abrasion as well as good gloss and flexibility;
- an ability to formulate a stable, aqueous coating composition having little or no grit or lumps; and
- an ability to formulate an vinyl polymer latex in an aqueous medium using a crosslinkable dispersion system, thereby eliminating the necessity of using undesirable potentially mobile surfactants for emulsion polymerization.

The aqueous two component, waterborne coating composition, prepared by the above procedure, can be applied as a coating to a substrate surface and dried. The dry coating is a heterogeneous composite in which the high Tg polyol-stabilized vinyl polymer latex particles are dispersed in a urethane continuous phase.

DETAILED DESCRIPTION OF THE INVENTION

This invention is directed to an improved aqueous based two component coating composition having low or zero VOC and to the method of making it. The composition is based on a combination of a polyol-stabilized non-functional, high Tg, vinyl polymer latex and a water dispersible polyisocyanate. It is formed by emulsion polymerizing one or more non-functional (i.e., having substantially no hydroxyl or carboxyl groups) vinyl monomers in an aqueous medium, in the presence of an emulsifier comprising one or more acid-containing polyols which have been neutralized with one or more reactive amines, and combining the polyol-stabilized high Tg vinyl polymer latex with a water dispersible polyisocyanate.

The polyols, according to this invention, are water dispersible and are preferably low molecular weight polymeric polyols containing terminal and/or pendant hydroxyl groups and free acid groups. The acid group can be carboxyl, sulfonic, or phosphoric acid groups. Upon neutralization with the reactive amines, the acid groups form salts which enable the polyol to function as an emulsifier for aqueous vinyl emulsion polymerization. The polymeric polyol backbone may be any of a number known in the art; for example, polyester, polyamide, polyesteramide, polyether, polyolefin, acrylic and methacrylic acid polymers, poly(vinyl acetate), and polyurethane. Polyester and polyacrylic polyols are preferred. The molecular weight (Mn) of the polyol or the average molecular weight (Mn) of the combination of polyols can range from 500 to 5000, preferably 800 to 3000. The hydroxyl number of the polyol can be 20 to 250, preferably 45 to 100 mg KOH/g polymer, and the acid number can be 6 to 100, preferably 40 to 70 mg KOH/g polymer. Topologically, the polyol can be linear and/or branched in structure.

The acid groups of the polyol are neutralized with water dispersible reactive amines containing no VOC. By reactive amines is meant amines containing isocyanate-reactive functional groups. A variety of reactive amines or blends of reactive amines can be used provided the amine or blends contain reactive hydrogens. For example, they can be selected from the group consisting of primary and secondary aliphatic, cycloaliphatic and aromatic amines; tertiary aliphatic and aromatic amines; alkanol amines, polyamines; and mixtures thereof. Examples of suitable reactive amines that are typically used in practice are, diethanolamine, dimethylethanol amine, triethanolamine, and 1,5-diamino-2-methylpentane.

Examples of non-functional vinyl monomers suitable for the production of the high Tg aqueous vinyl polymer latex are $C_1$ to $C_5$ alkyl esters of acrylic or methacrylic acid, vinyl esters of an alkanoic acid, styrene or substituted styrene, diacrylates, divinyl benzene, and mixtures thereof. Methyl methacrylate and styrene are preferred monomers because of the low cost of these compounds. Divinyl crosslinkers, such as a diacrylate (e.g., hexanediol diacrylate) and divinyl benzene, are preferably one of the monomers. Hexanediol diacrylate is typically combined with methyl methacrylate and divinyl benzene is typically combined with styrene. The amount of crosslinker can range from 0 to 5 wt % of the total monomers; preferably 0.1 to 2 wt %.

The monomer or monomer mixture should be such as to form an aqueous vinyl polymer latex having a high Tg. High Tg, as used herein, means a Tg that is higher than ambient temperature, i.e., the temperature at which the coating is being applied or the temperature to which the coating will be exposed. Preferably, the Tg is higher than about 50° C.

The polyol to monomer ratio used in the emulsion polymerization reaction can range, on a weight basis, from 0.1:1 to 0.5:1, preferably 0.25:1 to 0.4:1.

To form the aqueous polyol stabilized vinyl polymer emulsion, emulsion polymerization can be carried out using any of the well known thermal, redox, and photochemical processes. Thermal processes are particularly effective for this invention. Emulsion polymerization is typically conducted at temperatures ranging from 40 to 90° C., depending on the initiator system. A thermal initiator is typically used at temperatures at or above about 60° C. The amount of thermal initiator used in the process is 0.1 to 0.5 wt. %, preferably about 0.3 wt. %, based on the total weight of monomers. Thermal initiators are well known in the emulsion polymerization art and include, for example, ammonium, sodium, or potassium persulfate, peroxides, or azo compounds. Oil soluble thermal initiators are preferred.

The solids content of the aqueous polymer emulsion can range from 30 to 60%, preferably 40 to 50%.

Any of the known water dispersible polyisocyanates can be used in this invention. Examples of water dispersible polyisocyanates are presented in U.S. Pat. Nos. 5,200,489 and 5,563,207 which are hereby incorporated by reference. U.S. Pat. No. 5,200,489 discloses water dispersible polyisocyanates containing a polyisocyanate adduct prepared from 1,6-hexamethylene diisocyanate or a mixture of hexamethylene diisocyanate with up to 70% by weight, based on the weight of the diisocyanates, of another diisocyanate and at least 10% by weight, based on the weight of the polyisocyanate adduct, of an emulsifier which is based on the reaction product of a monohydroxy functional polyether and a polyisocyanate. U.S. Pat. No. 5,563,207 discloses water dispersible polyisocyanates based on aliphatic and aromatic diisocyanates, based on solids, of 6 to 21% by weight, a weight ratio of incorporated TDI units to incorporated HDI units of 6:1 to 1.0:1, and a content of ethylene oxide units, arranged within terminal polyether chains, of 5 to 40% by weight. A preferred water dispersible polyisocyanate is XP-7063, a water dispersible polyisocyanate based on hexamethylene diisocyanate, supplied by Bayer.

To form the two component aqueous coating system, the polyisocyanate component is mixed with the polyol stabilized acrylic polymer latex. Optionally, a polyhydric alcohol, preferably an alcohol having three terminal hydroxyl groups, is also mixed with the water dispersible polyisocyanate and the polyol stabilized acrylic polymer latex. Addition of the polyhydric alcohol is preferred, in order to improve the hardness of the coating. The amount of polyhydric alcohol used is dependent on the desired hardness and flexibility of the dry coating. Examples of appropriate polyhydric alcohol are trimethyolethane, trimethyolpropane, and trimethylolbutane.

The two component aqueous coating composition formed, as described above, can have a solids content of from 20 to 70 wt %, preferably 40 to 70 wt % and an isocyanate/hydroxy (NCO/OH) equivalent ratio ranging from 0.5:1 to 5:1, preferably 1:1 to 2:1. It can be applied as a coating to any of many substrates, including wood, metals, glass, cloth, leather, plastics, foam and the like. Generally, after application to a substrate, the aqueous coating composition is dried and cured at ambient temperature for a week.

Other ingredients commonly used in coating formulations, such as catalysts for the isocyanate-polyol reaction, surfactants, light stabilizers, etc., can optionally be added to the formulation to obtained desired properties. In addition, other pigments and pigment dispersions can be used to modify optical properties, mechanical strength, and corrosion inhibition. These compositional modifications are well known in the art of coating formulations.

Compared to current two-component waterborne urethane systems, incorporation of the high Tg vinyl polymer latex into the coating composition of this invention reduces the cost of the composition. In addition, application of the two-component coating composition of this invention to a substrate surface, results in a coating having a much shorter drying time than known two-component waterborne urethane systems. Without intending to be bound by theory, it is believed that the polyol molecules are attached to the outer surface of the polymer latex particles and thus facilitate dispersion of the latex particles in the water dispersed polyisocyanate. The coating derived from the combination has hard vinyl polymer latex particles dispersed in a continuous urethane phase. It is also believed that the hard vinyl polymer latex particles dispersed in the urethane continuous phase of the dry coating behave like a re-enforcing filler and improve the performance of the coating.

The invention will be further clarified by a consideration of the following examples, which are intended to be purely exemplary of the invention.

EXAMPLE 1

Preparation of Polyol Stabilized Acrylic Polymer Latex from Methyl methacrylate (MMA) and Hexanediol Diacrylate (HDAc)

This example illustrates the process of preparation of a polyol stabilized crosslinked methacrylate latex using the ingredients listed in the following table:

| Raw Materials | Parts by Weight |
| --- | --- |
| 1. Polyester polyol (acid # = 48, hydroxyl # = 75; MW~1500) | 118.18 |
| 2. Deionized Water | 150.00 |
| 3. Diethanol amine | 3.20 |
| 4. Dytek A (2-methyl-1,5-pentanediamine) | 1.36 |
| 5. Ammonium hydroxide (28%) | 5.90 |
| 6. Deionized Water | 100.00 |
| 7. Methyl Methacrylate | 268.00 |
| 8. Hexanediol Diacrylate | 2.00 |
| 9. Vazo-52 (2,2'-azobis[2,4-dimethylpentanenitrile]) | 0.80 |
| 10. Deionized Water | 350.00 |

The polyester polyol (1) and deionized water (2) were charged into a nitrogen purged 1-liter reactor. The mixture was heated to 60° C. To this mixture, amines (3), (4), and (5) were added and deionized water (6) was used to rinse the residual amine into the reactor. The temperature was kept at 60° C. for 20 minutes and cooled down to room temperature. With constant stirring, methyl methacrylate (7), hexanediol diacrylate (8) and Vazo-52 were added to the reactor. To this premix, deionized water (10) was added. The acrylate polymerization was initiated by heating the dispersion to 65° C. The temperature was held at 65° C. for at least 2 hours.

EXAMPLE 2

Preparation of Polyol Stabilized Acrylic (MMA and HDAc) Polymer Latex using a Different Initiator The procedure of Example 1 was followed except that Vazo-67 (2,2'-azobis[2-methyl butyronitrile]) was substituted for Vazo-52 and the polymerization temperature was raised to 75° C. All other parameters remained the same. The goal of this example was to determine the type of product that could be achieved with a less toxic initiator.

EXAMPLE 3

Preparation of Polyol Stabilized Acrylic Polymer Latex (Butyl Methacrylate and HDAc)

The procedure of Example 1 was repeated except that butyl methacrylate was used as the major monomer in an attempt to lower the Tg of the latex. All other parameters were the same.

EXAMPLE 4

Preparation of Polyol Stabilized Acrylic (MMA and HDAc) Polymer Latex using a Polymeric Polyol Containing Pendent Carboxyl Groups The procedure of Example 1 was repeated except that a polymeric polyol containing pendent carboxyl groups (M.W. ~916; acid #=61, hydroxyl #=75) was used as the stabilizer for the acrylic polymerization. All other parameters were the same.

EXAMPLE 5

Preparation of Polyol Stabilized Acrylic (MMA and HDAc) Latex using Ammonium Hydroxide in place of Amine Mixture The procedure of Example 1 was repeated except that ammonium hydroxide was used the counter ion instead of an amine mixture. All other parameters were the same.

EXAMPLE 6

Preparation of Polyol Stabilized Acrylic (MMA and HDAc) Latex using Diethanol Amine in place of Amine Mixture The procedure of Example 1 was repeated except that diethanol amine was used as the counter ion. All other parameters were the same.

RESULTS

The latexes of Examples 1–6 were stable and had a solids content of about 40%. The Tg of the latexes prepared in Examples 1, 2, 4, 5, and 6 was about 100° C. The Tg of the latex prepared in Example 3, in which butyl methacrylate was used in place of methyl methacrylate, was about 20° C., resulting in a much softer coating than coatings prepared with the latexes of the Examples 1, 2, 4, 5, and 6.

EXAMPLE 7

Coating formulation and Casting

The polyol stabilized acrylic latex of the previous examples were evaluated for a conventional coating application using the following formulation:

| Component | Parts by Weight |
| --- | --- |
| 1. Polyol Stabilized Acrylic Latex | 100.00 g |
| 2. TMP (Trimethylolpropane) | 3.70 g |
| 3. XP-7063* | 40.00 g |

*solvent free, water dispersible polyisocyanate based on hexamethylene diisocyanate, supplied by Bayer All three components were mixed together and stirred for 15 minutes. The mixture was then allowed to sit for 5 minutes, after which a clear film was cast. After an induction time of an additional 60 minutes, another clear film was cast. The coating composition, which was applied in a wet film thickness of 300 μm (which corresponds to, dry film thickness of approximately 50 μm) immediately appeared clear and transparent at room temperature. Final curing was achieved after 7–10 days at ambient laboratory conditions. The properties for the cured coating, using the latex of Example 1, are listed in the table below:

| | |
| --- | --- |
| Dry Time (Set to touch) | 30 minutes |
| 20° gloss (ASTM D523) | >90 |
| 60° gloss (ASTM D523) | >95 |
| Adhesion | |
| Dry tape (ASTM D3359) | 5A |
| Wet tape (24 hr @ 70° F.) | ~4A |
| Chemical Resistance | |
| MEK (ASTM D4752) | >200 double rubs |
| Toluene | >200 double rubs |
| Isopropanol | >200 double rubs |
| Acid, 5% $H_2SO_4$, pH ~0.6 | No effect |
| Base, 5% NaOH, pH ~13.5 | No effect |
| Impact resistance (ASTM D2794) | >160 in-lbs |
| Pendulum hardness (ASTM D4366) | 120~170 cycles |

The above results show that gloss and chemical resistance of the resulting coating were excellent. Gloss exceeded 90 and the double rub exceeded 200 for 5 several solvents. Similar results were obtained with coatings in which the latex of Examples 2, 4, 5, and 6 was used in the coating composition. When the latex of Example 3 was used in the coating composition, gloss and performance with regard to solvent resistance was not as good as those compositions in which the high Tg latexes of Examples 1, 2, 4, 5, and 6 were used.

We claim:

1. An aqueous based, heterogeneous two component coating composition comprising:
   (a) a high Tg aqueous vinyl polymer latex having substantially no hydroxyl or carboxyl functionality and stabilized with a polyol emulsifier comprising one or more polyols, wherein at least one polyol contains acid groups which have been neutralized with one or more reactive amines, and
   (b) a water-dispersible polyisocyanate, and, optionally, a polyhydric alcohol, wherein the equivalent ratio of isocyanate groups to hydroxyl groups ranges from 0.5:1 to 5:1.

2. The aqueous based, heterogeneous two component coating composition of claim 1 wherein the aqueous vinyl polymer latex has a Tg of at least about 50° C.

3. The aqueous based, heterogeneous two component coating composition of claim 2 wherein the high Tg aqueous vinyl polymer latex is based on monomers selected from the group consisting of a $C_1$ to $C_5$ alkyl ester of acrylic, a $C_1$ to $C_5$ alkyl ester of methacrylic acid, a vinyl ester of an alkanoic acid, styrene, hexanediol diacrylate, divinyl benzene, and mixtures thereof.

4. The aqueous based, heterogeneous two component coating composition of claim 3 wherein the high Tg aqueous vinyl polymer latex is based on methyl methacrylate and hexanediol diacrylate or on styrene and divinyl benzene.

5. The aqueous based, two component coating composition of claim 3 wherein the one or more polyols have an average Mn of 800 to 3000, a hydroxyl number of 45 to 100, and an acid number of 40 to 70.

6. The aqueous based, two component coating composition of claim 5 wherein (b) is a water dispersible polyisocyanate and a trihydric alcohol.

7. The aqueous based, two component coating composition of claim 6 wherein the equivalent ratio of isocyanate groups to hydroxyl groups ranges from 1:1 to 2:1.

8. The aqueous based, two component coating composition of claim 7 wherein the coating composition contains 40 to 70 wt % solids.

9. A process for making a heterogeneous, aqueous based, two component coating composition comprising:
   a) neutralizing one or more acid-containing, water dispersible polyols with one or more reactive amines;
   b) mixing the neutralized acid-containing, water dispersible polyol with one or more non-functional vinyl monomers, wherein the non-functional vinyl monomers are such that polymerization will yield a high Tg polymer;
   c) mixing a free radical initiator with the polyol/monomer mixture in an aqueous medium;
   d) polymerizing the vinyl monomers by heating the aqueous dispersion to form a polyol stabilized high Tg aqueous vinyl polymer latex;
   e) cooling the polyol stabilized high Tg aqueous vinyl polymer emulsion; and
   f) mixing the polyol stabilized high Tg aqueous vinyl polymer emulsion with a water dispersible polyisocyanate and, optionally, a polyhydric alcohol, to form the heterogeneous, aqueous based, two component coating composition.

10. The process of claim 9 wherein the high Tg aqueous vinyl polymer emulsion has a Tg of at least 50° C.

11. The process of claim 10 wherein the one or more non-functional vinyl monomers is selected from the group consisting of a $C_1$ to $C_5$ alkyl ester of acrylic acid, a $C_1$ to $C_5$ alkyl ester of methacrylic acid, a vinyl ester of an alkanoic acid, styrene, hexanediol diacrylate, divinyl benzene, and mixtures thereof.

12. The process of claim 11 wherein the one or more monomers is a mixture of methyl methacrylate and hexanediol diacrylate or a mixture of styrene and divinyl benzene, and the polyhydric alcohol is a trihydric alcohol.

13. The process of claim 11 wherein the one or more acid containing polyol has an Mn of 800 to 3000, a hydroxyl number of 45 to 100, and an acid number of 40 to 70, and the ratio of polyol to monomer, on a weight basis, ranges from 0.1 to 1 to 0.5 to 1.

14. The process of claim 13 wherein the ratio of polyol to monomer, on a weight basis, ranges from 0.25 to 1 to 0.4 to 1.

15. The process of claim 14 wherein the equivalent ratio of isocyanate groups to hydroxyl groups ranges from 1:1 to 2:1.

16. The process of claim 15 wherein the heterogeneous, aqueous based, two component coating composition contains 40 to 70 wt % solids.

17. The process of claim 16 wherein in (f) the polyol stabilized high Tg aqueous vinyl polymer emulsion is mixed with a water dispersible polyisocyanate and a trihydric alcohol.

18. A coating which is prepared from a heterogeneous, aqueous based, two component coating composition which may be cured at ambient temperature, wherein the heterogeneous, aqueous based, two component coating composition comprises:

(a) a high Tg aqueous vinyl polymer latex having substantially no hydroxyl or carboxyl functionality and stabilized with a polyol emulsifier comprising one or more polyols, wherein at least one polyol contains acid groups which have been neutralized with one or more reactive amines; and (b) a water-dispersible polyisocyanate and, optionally, a polyhydric alcohol, wherein the equivalent ratio of isocyanate groups to hydroxyl groups ranges from 0.5:1 to 5:1.

19. The coating of claim 18 wherein the aqueous vinyl polymer latex has a Tg of at least about 50° C.

20. The coating of claim 19 wherein the high Tg aqueous vinyl polymer latex is based on monomers selected from the group consisting of a $C_1$ to $C_5$ alkyl ester of acrylic, a $C_1$ to $C_5$ alkyl ester of methacrylic acid, a vinyl ester of an alkanoic acid, styrene, hexanediol diacrylate, divinyl benzene, and mixtures thereof.

21. The coating of claim 20 wherein the high Tg aqueous vinyl polymer latex is based on methyl methacrylate and hexanediol diacrylate or on styrene and divinyl benzene.

22. The aqueous based, two component coating composition of claim 20 wherein the one or more polyols have an average Mn of 800 to 3000, a hydroxyl number of 45 to 100, and an acid number of 40 to 70.

23. The coating of claim 22 wherein the equivalent ratio of isocyanate groups to hydroxyl groups ranges from 1:1 to 2:1.

24. The coating of claim 23 wherein the coating composition contains 40 to 70 wt % solids.

25. The coating of claim 24 wherein (b) is a water-dispersible polyisocyanate and a trihydric alcohol.

* * * * *